(12) United States Patent
Tsuru et al.

(10) Patent No.: US 6,203,201 B1
(45) Date of Patent: Mar. 20, 2001

(54) LINEAR BEARING

(75) Inventors: Kazuo Tsuru, Nara; Tsugio Matsushita; Hiroshi Ono, both of Kashiwara; Kazuyoshi Yamakawa, Nishinomiya, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/243,792

(22) Filed: Feb. 3, 1999

(30) Foreign Application Priority Data

Feb. 6, 1998 (JP) .................................................. 10-025495

(51) Int. Cl.[7] .................................................. F16C 29/04
(52) U.S. Cl. ................................. 384/52; 384/51; 384/57
(58) Field of Search .................................. 384/25, 49, 50, 384/51, 52, 54, 56, 57

(56) References Cited

U.S. PATENT DOCUMENTS

| | | | |
|---|---|---|---|
| Re. 34,736 | * | 9/1994 | Hanaway ................................. 384/49 |
| 4,648,727 | * | 3/1987 | O'Neil et al. ........................... 384/49 |
| 5,096,307 | * | 3/1992 | Hanaway ................................. 384/49 |
| 5,141,337 | * | 8/1992 | Hanaway ................................. 384/49 |
| 5,350,185 | * | 9/1994 | Robinson ........................... 384/49 X |
| 5,375,932 | * | 12/1994 | Hanaway ................................. 384/49 |
| 5,489,253 | * | 2/1996 | Ito et al. ................................. 384/52 |
| 5,494,353 | * | 2/1996 | Diemer ............................... 384/49 X |
| 5,622,434 | * | 4/1997 | Takahashi ............................. 384/49 |
| 5,707,153 | * | 1/1998 | Steinberger et al. .................. 384/49 |

FOREIGN PATENT DOCUMENTS 54-137542  10/1979  (JP) .

* cited by examiner

Primary Examiner—Charles A Marmor
Assistant Examiner—Saúl Rodríguez
(74) Attorney, Agent, or Firm—Jacobson, Price, Holman & Stern, PLLC

(57) ABSTRACT

A linear bearing is provided which can allow a shaft to relatively reciprocally move with respect to an outer race in the axial direction, and also to rotate in the circumferential direction. In the linear bearing of the invention, an outer race supports a shaft via balls which are retained by a retainer. A push ring is fitted to the outer race so as to be reciprocable in the axial direction. Three coil springs which are arranged at the intervals of 120° in the circumferential direction are contractedly interposed between a lid fixed to the outer race and the push ring, so as to press the push ring toward the retainer. Spring pins which protrude in the axial direction are fixed to the lid. Tip ends of the spring pins are reciprocally fitted into holes formed in the push ring, thereby preventing the push ring from rotating.

6 Claims, 2 Drawing Sheets

LINEAR BEARING

BACKGROUND OF THE INVENTION

The invention relates to a linear bearing which can be suitably used in an apparatus which performs rotational and reciprocal motions, such as a polishing apparatus for a semiconductor.

Conventionally, a linear bearing such as shown in FIG. 2 is used. The linear bearing comprises a sleeve 52 which supports a shaft 51 via balls 56. Spline grooves 53 and 54 are formed in the shaft 51 and the sleeve 52, respectively, and the balls 56 are arranged between the spline grooves 53 and 54. A retainer 55 which retains the balls 56 is urged by coil springs 57 from both the sides in the axial direction.

When a force in the axial direction acts on the shaft 51 to move the shaft 51, the balls 56 on the spline grooves 53 and 54 roll along the spline grooves 53 and 54, and the retainer 55 moves in the axial direction together with the balls 56 against the urging force of the coil springs 57.

However, the linear bearing of the prior art has the following problem. The shaft 51 can reciprocally move in the axial direction. When a force for rotating the shaft 51 in the circumferential direction is applied to the shaft 51, however, the shaft 51 cannot rotate in the circumferential direction because the balls 56 cannot move in the circumferential direction beyond the spline grooves 53 and 54.

SUMMARY OF THE INVENTION

Consequently, it is an object of the invention to provide a linear bearing which can allow a shaft to relatively reciprocally move with respect to an outer race in the axial direction, and also to rotate in the circumferential direction.

In order to attain the object, the linear bearing of the invention is characterized in that the linear bearing comprises: an outer race; plural rolling elements for reciprocably supporting a shaft on the outer race; a retainer which retains the rolling elements; a push ring which is reciprocally disposed in the outer race; a lid fixed to the outer race; an elastic member which is disposed between the push ring and the lid and which urges the push ring toward the retainer; and a rotation preventing member which prevents the push ring from rotating.

In the linear bearing of the invention, when a force for relatively moving the shaft with respect to the outer race in the axial direction is applied, the plural rolling elements supported by the outer race roll, so that the shaft moves in the axial direction and also the retainer retaining the rolling elements moves in the axial direction. When the retainer abuts against the push ring, the push ring is pressed against the force of the elastic member and the shaft moves in the axial direction. In this way, the shaft reciprocally moves in the axial direction.

By contrast, when the shaft is relatively rotated with respect to the outer race in the circumferential direction, the plural rolling elements roll in the circumferential direction and also the retainer retaining the rolling elements rotates in the circumferential direction. When the retainer abuts against the push ring, the retainer slides over the abutting face of the push ring so as to rotate in the circumferential direction. At this time, the rotation preventing member prevents the push ring from corotating with the retainer in the circumferential direction. Therefore, the elastic member which is disposed between the push ring and the lid is not twisted in the circumferential direction nor tilted. As a result, the linear bearing allows the shaft to perform both rotational motion in the axial direction and reciprocal motion in the circumferential direction.

The linear bearing of the invention is characterized in that, the outer race is provided with a stopper against which the push ring is to abut.

In the linear bearing of the invention the push ring urged by the elastic member is engaged with the stopper of the outer race. Therefore, the stop position of the push ring is defined.

The linear bearing of the invention is characterized in that, one of the retainer and the push ring is formed by a member which has excellent slidability with respect to the other one of the retainer and the push ring.

In the linear bearing of the invention, since one of the retainer and the push ring is formed by a member which has excellent slidability with respect to the other one, the retainer can smoothly slide with respect to the push ring.

The linear bearing of the invention is characterized in that, the elastic member is one of a coil spring, a corrugated plate spring, and a magnet.

In the linear bearing of the invention, since the elastic member is one of a coil spring, a corrugated plate spring, and a magnet, the push ring can be returned to the stop position by manes of a structure which is simple, economical, and compact.

DETAILED DESCRIPTION OF THE PREFERRED EMBODIMENTS

Hereinafter, a preferred specific embodiment of the invention will be described with reference to the accompanying drawings.

Figure 1:
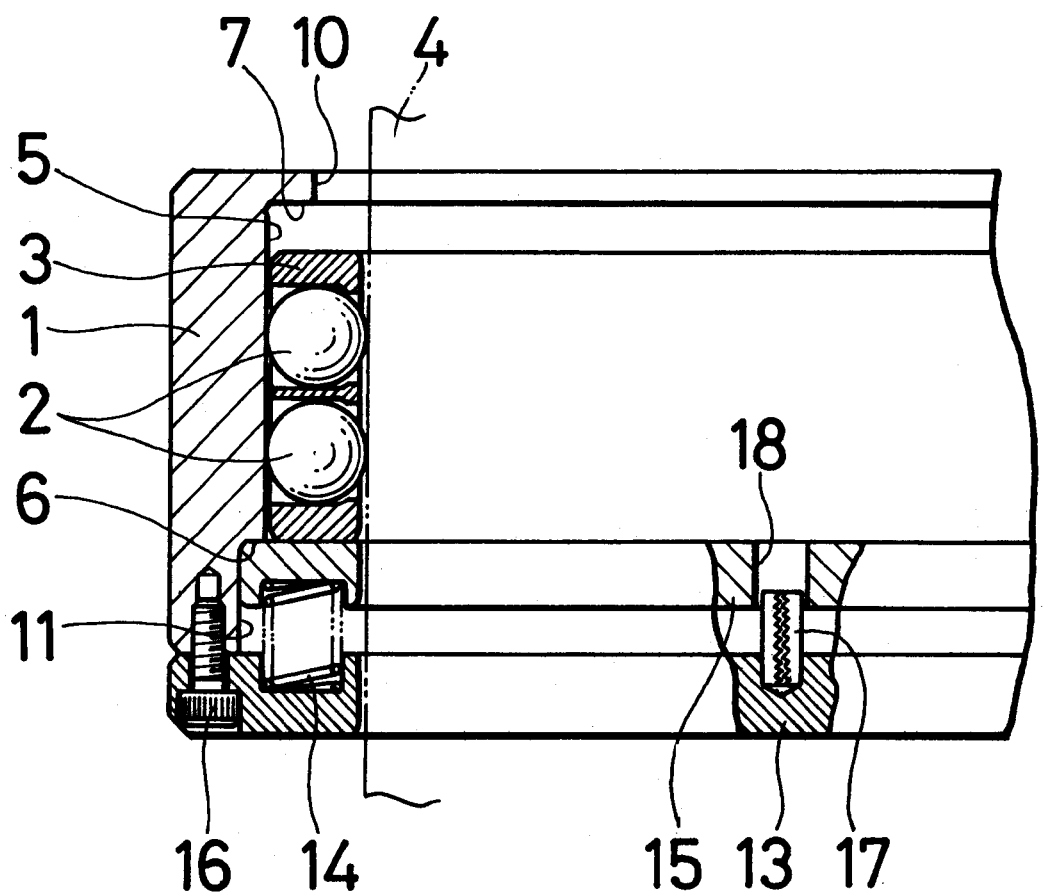
FIG. 1 is a section view of a linear bearing which is an embodiment of the invention.
Figure 2:
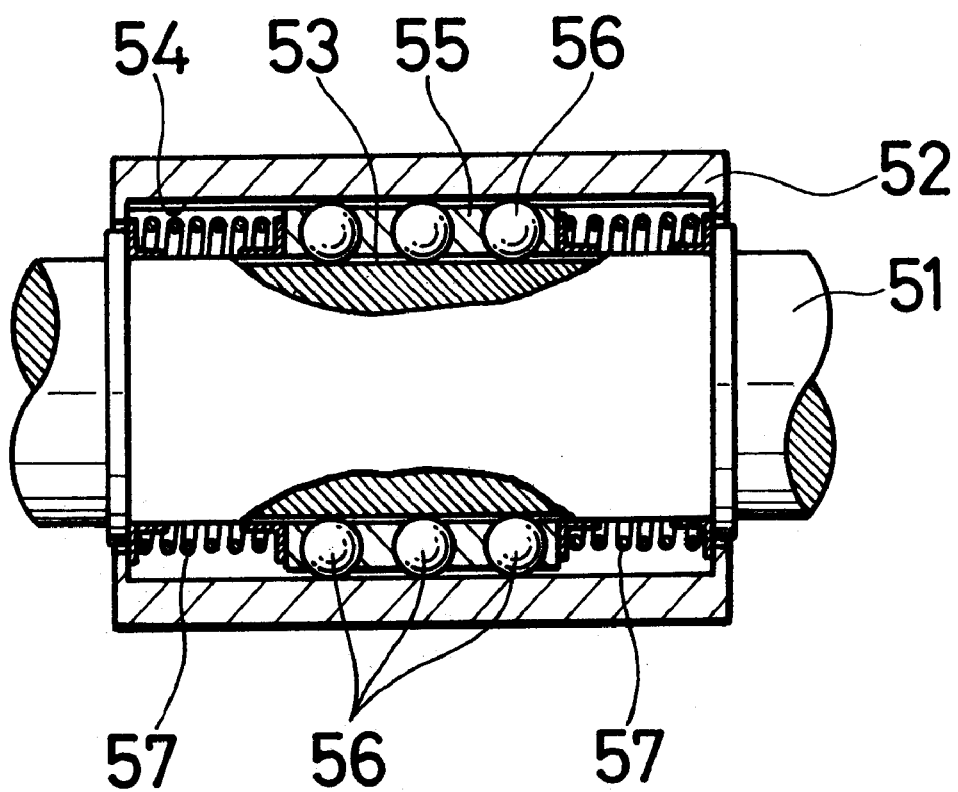
FIG. 2 is a section view of a linear bearing of the prior art.

FIG. 1 is a section view of a linear bearing which is an embodiment of the invention. The linear bearing comprises an outer race 1, plural balls 2 serving as rolling elements, and a retainer 3 which retains the balls 2 and which is made of Teflon (trademark). The outer race 1 supports a shaft 4 (indicated by a phantom line in the figure) via the plural balls 2.

In the outer race 1, a large-diameter inner peripheral face 11 and a small-diameter inner peripheral face 10 are respectively formed on the sides of an intermediate-diameter inner peripheral face 5 serving as a raceway surface, thereby forming steps 6 and 7 functioning as stoppers. A push ring 15 is fitted to the large-diameter inner peripheral face 11 so as to be reciprocable in the axial direction. A ring-like lid 13 is fixed to an end portion of the outer race 1 on the side of the large-diameter inner peripheral face 11, by three bolts 16 (in the figure, only one bolt is shown) at the intervals of 120° in the circumferential direction. Three coil springs 14 (in the figure, only one spring is shown) which are arranged at the intervals of 120° in the circumferential direction are contractedly interposed between the lid 13 and the push ring 15, so as to press the push ring 15 until the ring abuts against the step 6. In this way, the push ring 15 is engaged with the step 6 to define the still positions of the push ring 15 and the retainer 3. The step 7 is used for preventing the retainer 3 from slipping off.

Spring pins 17 serving as rotation preventing members are respectively fixed to three places of the lid 13 which are at the intervals of 120° in the circumferential direction, so as to protrude in the axial direction (in FIG. 1, only one pin is shown). The protruding portions of the spring pins 17 are reciprocably fitted into holes 18 formed in the push ring 15, thereby preventing the push ring 15 from rotating.

In the thus configured linear bearing, when a force for relatively moving the shaft 4 with respect to the outer race 1 in the axial direction is applied, the plural balls 2 which are supported by the outer race 1 roll, so that the shaft 4 moves in the axial direction. In accordance with the rolling of the balls 2, also the retainer 3 retaining the balls 2 moves in the axial direction. When the retainer 3 abuts against the push ring 15, the push ring 15 is pressed against the force of the coil springs 14 and the shaft 4 moves in the axial direction. In this way, the shaft 4 reciprocally moves in the axial direction.

By contrast, when the shaft 4 is relatively rotated with respect to the outer race 1 in the circumferential direction, the plural balls 2 roll in the circumferential direction. In accordance with the rolling of the balls 2, also the retainer 3 retaining the balls 2 rotates in the circumferential direction. When the retainer 3 abuts against the push ring 15, the retainer slides over the abutting face of the push ring 15 so as to rotate in the circumferential direction. At this time, since the retainer 3 is made of Teflon, the retainer exerts excellent slidability. Therefore, the retainer 3 can smoothly slide with respect to the push ring 15. Since the spring pins 17 are fitted into the holes 18, the pins prevent the push ring 15 from corotating with the retainer 3 in the circumferential direction. Therefore, the coil springs 14 which are interposed between the push ring 15 and the lid 13 are not twisted in the circumferential direction nor tilted.

As a result, the linear bearing allows the shaft 4 to perform both reciprocal motion in the axial direction and rotational motion in the circumferential direction, or spiral motion in which the rotational motion is combined with the rotational motion.

In the embodiment, the spring pins 17 are used for preventing the push ring 15 from rotating. In place of the spring pins 17, a projection/depression engaging portion which allows the lid 13 and the push ring 15 to be engaged with each other in the circumferential direction and relatively move in the axial direction may be used.

In the embodiment, the lid 13, the coil springs 14, and the push ring 15 are disposed on one side of the outer race 1. Alternatively, these components may be disposed on both the sides of the outer race 1.

In the embodiment, the retainer 3 is made of Teflon. The push ring also may be made of Teflon. Alternatively, these components may be made of gunmetal which has excellent slidability, or Bakelite, or configured by coating a material of excellent slidability.

In the embodiment, the coil springs are used as the elastic member. Alternatively, the elastic member may be a corrugated plate spring, or a magnet. These elastic members have a structure which is simple, economical, and compact, and can return the push ring to the stop position.

As apparent from the above description, the linear bearing of the invention comprises the elastic member which urges the push ring toward the retainer, and the rotation preventing member which prevents the push ring from rotating. Even when the shaft rotates with respect to the outer race and the retainer rotates with respect to the push ring, therefore, it is possible to prevent the push ring from corotating. Consequently, the linear bearing can perform both reciprocal motion in the axial direction and rotational motion.

In the linear bearing of the invention since the outer race is provided with the stopper against which the push ring is to abut, the stop position of the push ring can be defined.

In the linear bearing of the invention, since one of the retainer and the push ring is formed by a member which has excellent slidability with respect to the other one, the retainer can smoothly slide with respect to the push ring.

In the linear bearing of the invention, since the elastic member is one of a coil spring, a corrugated plate spring, and a magnet, the push ring can be returned to the stop position by means of a structure which is simple, economical, and compact.

What is claimed is:

1. A linear bearing comprising: an outer race; plural rolling elements for reciprocably supporting a shaft on said outer race; a retainer which retains said rolling elements; a push ring which is reciprocally disposed in said outer race; a lid fixed to said outer race; an elastic member which is disposed between said push ring and said lid and which urges said push ring toward said retainer; a rotation preventing member which prevents said push ring from rotating; and wherein said outer race is provided with a stopper against which said push ring is to abut.

2. The linear bearing according to claim 1, wherein one of said retainer and said push ring is formed by a member which provides slidability with respect to the other one of said retainer and said push ring.

3. The linear bearing according to claim 1, wherein said outer race has a flat cylindrical surface.

4. The linear bearing according to claim 1, wherein said shaft has a flat cylindrical surface.

5. The linear bearing according to claim 1, wherein said shaft can reciprocally move in an axial direction and can rotate in a circumferential direction.

6. The linear bearing according to claim 1, wherein said rolling element is a ball.

\* \* \* \* \*